UNITED STATES PATENT OFFICE.

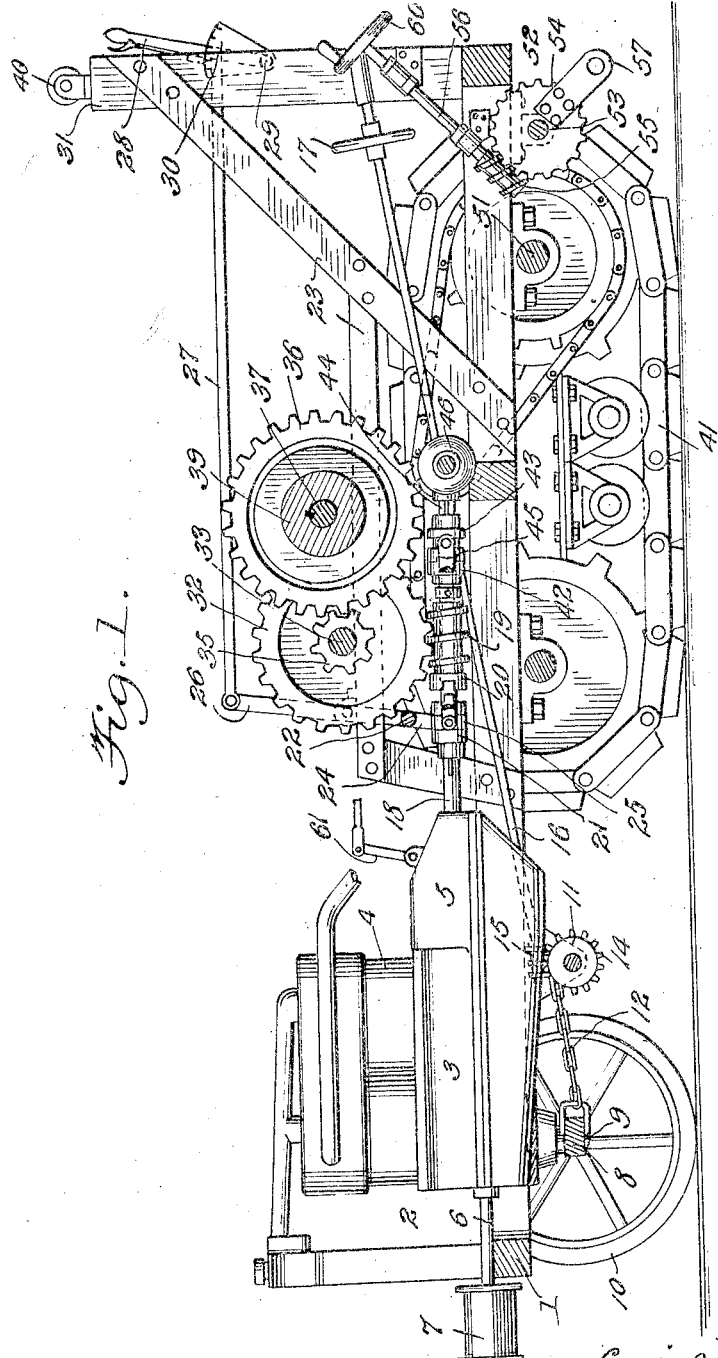

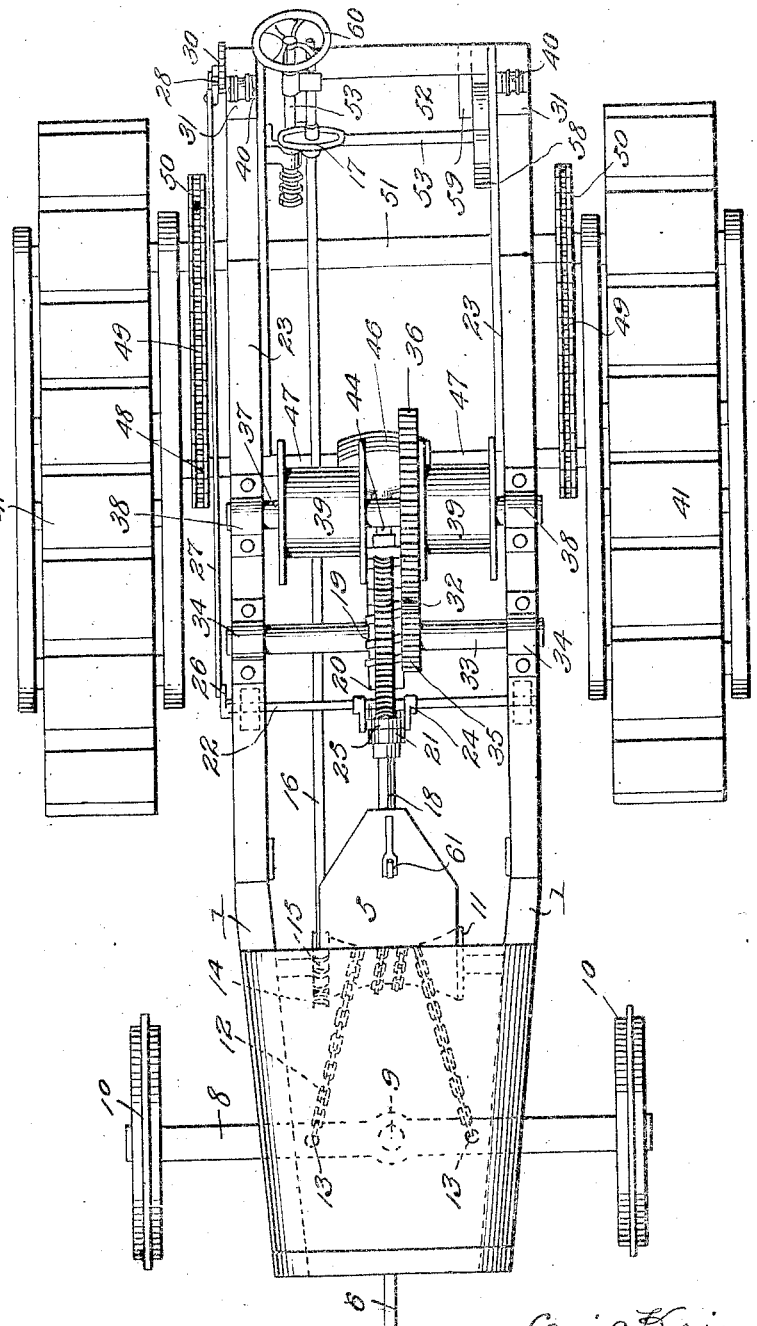

LEVI KRING, OF WESTERVILLE, OHIO.

TRACTOR.

1,328,839.  Specification of Letters Patent.  Patented Jan. 27, 1920.

Application filed September 12, 1918. Serial No. 253,679.

*To all whom it may concern:*

Be it known that LEVI KRING, a citizen of the United States, residing at Westerville, in the county of Franklin and State of Ohio, has invented certain new and useful Improvements in Tractors, of which the following is a specification.

This invention relates to tractors, and has for its main object to provide a tractor of efficient construction and capable of being employed in manifold capacities in connection with agricultural pursuits.

Another object resides in a farm tractor of wide utility possessing substantial and practical features of construction, ease of operation and control and one wherein improved means are provided for drawing and regulating the operation of coöperative plow units, so that the depth of operation of the units when plowing soil may be readily varied and maintained in such adjusted positions, and to provide further means for lifting the plow units from the soil altogether.

A further object resides in a tractor wherein is provided a main frame upon which is supported the power plant, said frame being further provided with traction mechanism and with a plurality of hoisting drums, utilized in effecting the operation of mechanism coöperative with the tractor, and motion imparting means of a novel character being situated to transmit motion from the power plant to the traction mechanism and to the hoisting drum, said means being of a character to render the action of the hoisting drums powerful and reliable in operation and further capable of independently actuating said drums and the traction mechanism.

Other objects of this invention and the features of construction thereof are clearly presented in the following description, when the latter is read in connection with the accompanying sheets of drawing, forming a part of this specification, and in which similar characters of reference denote like and corresponding parts throughout the several views thereof.

In the drawings:

Figure 1 is a vertical sectional view taken through the tractor comprising the present invention, and Fig. 2 is a top plan view thereof.

In the form of my invention exemplified in the accompanying drawings, there is provided a main frame or bed 1, which may be of any desired construction or formed from any suitable materials, and while wooden beams have been shown as constituting the frame, it will be appreciated that the same may be formed from metal if desired. Mounted upon the forward end of this frame is a power plant 2 of any suitable character, the same preferably being in the form of an internal combustion engine and is provided with the usual crane case 3, cylinders 4 and fly wheel and transmission housing 5. The forward end of the shaft 6 of the engine may be equipped, as shown in Fig. 1, with a pulley wheel 7, the latter being adapted to be employed for driving various forms of farm machinery.

To effect the steering of the tractor, I have shown for purposes of illustration an oscillatory axle member 8, which is centrally pivoted as at 9 to the frame 1. The ends of this member are equipped with steering wheels 10 of any suitable construction and are free to rotate upon the ends of said axle member. Conventional means have been disclosed for controlling the steering movements of the axle member and consists of a rotatable drum 11, mounted in suitable bearings depending from the sides of the frame 1. Over this drum is passed a chain 12, which has its extremities secured as at 13 to said axle member. It will be seen that by rotating the drum, the chain 12 will be operated in the usual manner to oscillate said axle member. The drum in this instance is equipped with a worm gear 14 which meshes with a similar gear 15 carried upon the forward end of a steering shaft 16, the latter leading toward the rear of the tractor and is provided with a hand wheel 17 to effect its rotation.

Extending from the transmission housing 5 of the power plant is a drive shaft 18 which has loosely mounted thereon a worm 19. This worm is provided with a clutch face 20 for coöperation with a sliding clutch member 21 feathered to the shaft 18. It will be seen that by coupling the member 21 with the worm gear, the latter will be rotated in unison with the drive shaft. To effect this adjustment, use is made of a shaft 22 which extends transversely of the frame 1 and is mounted for rocking movement upon a superposed or auxiliary frame 23 carried by the main frame 1. This shaft 22 is equipped with depending crank members 24, which are connected with the loose ring 25 of the clutch member 21, so that upon the oscillation of the shaft 22, coöperative sliding movement will be imparted to the clutch member 21, thus causing the latter to be forced into or out of engagement with the clutch face 20 of the gear 19. In order to rock the shaft 22, the latter is provided on one side at a point above its pivotal connection with a frame 23 with an upstanding crank arm 26, to which is connected a longitudinally extending link member 27. This member extends rearwardly of the tractor and is connected at its rear end with a lever 28. This lever is mounted for pivotal movement as at 29 and coöperates by means of a spring pressed latch with a notched segment 30, whereby controlled and adjusted movement may be imparted to the sliding clutch member 21, and the latter may thus be securely retained in or out of engagement with the clutch face 20. The segment 30 is preferably mounted upon one of a pair of upstanding posts 31 forming a part of the auxiliary frame 23, as is clearly shown in Fig. 1.

Meshing with the gear 19 is a gear 32, which latter is fixedly carried upon a transversely extending shaft 33, mounted for rotation in fixed bearings 34 carried by the frame 23, whereby upon the rotation of the worm gear 19 similar and reduced motion will be imparted to the gear 32. Also carried by the shaft 33 and located contiguous to the gear 32 is a pinion 35 which is disposed to mesh with an enlarged gear 36 carried by a drum shaft 37, this latter shaft being disposed to extend parallel with the gear shaft 33 and is also mounted for rotation in suitable bearings 38 carried by the auxiliary frame. It will thus be manifest that when the clutch member 21 is in engagement with the clutch face 20, motion will be imparted from the power plant 2 to the shaft 37. Carried by the shaft 37 and subject to revolve in unison therewith are a plurality of drum members 39, which members are employed in one capacity to facilitate the lifting of plows (not shown) coöperatively drawn by the tractor. To this end the posts 31 are equipped at their upper ends with a pair of pulleys 40, over which suitable cables (not shown) may be trained. These cables are adapted in this particular instance to be suitably connected with the plow frames and are trained over the pulleys 40 so as to be wound about the drum members 39. It will be seen that upon the rotation of the drum members in a specified direction, these cables will be wrapped or wound thereabout so as to effect the elevation of the plows. These drums may be employed in many other capacities, and are particularly useful in connection with the extricating of tree stumps from the soil.

As a matter of fact it will be stated that the use of this tractor in connection with the extricating of tree stumps forms one of its most useful adaptations, although the tractor as constructed is adapted for universal farm service.

The traction mechanism 41 of the tractor in this instance is of the so called caterpillar form although ordinary driving wheels may be substituted in lieu thereof, and to impart power to this tractor mechanism, the shaft 18 is provided with a second fixed clutch member 42, which member is adapted for coöperation with a sliding clutch sleeve 43 carried by a short shaft section 44. By drawing the sleeve 43 into coupling relation with the member 42 motion will be imparted from the drive shaft 18 to the shaft section 44, which, as will appear hereinafter imparts motion to the traction mechanism. The clutch sleeve 43 coöperates with the clutch member 21 by means of a link 45 which is so arranged that when the drum driving mechanism is out of gear the traction mechanism will be in gear and vice versa, this measure being taken to prevent the rotation of the drums when the tractor is in motion.

The shaft section 44 extends to a differential casing 46, from which extend transverse shafts 47. The ends of these latter shafts are equipped with fixed sprockets 48, from which extend transverse shafts 47. The ends of these latter shafts are equipped with fixed sprockets 48, over which are trained chains 49, leading to similar sprockets 50 carried upon the main drive shaft 51 of the traction mechanism. It will be appreciated that the rotation of this shaft 51 effects the operation of the caterpillar drive in the usual manner.

As shown in Fig. 1, I provide an adjustable plow hitch 52 which in this instance consists of a shaft 53 carried by bearings depending from the rear end of the frame 1. This shaft 53 is equipped at one side with a gear 54, which meshes with a worm 55 carried by the lower end of a shaft 56, suitably journaled for rotation. This gear 54 is equipped with a bracket 57 suitably apertured to receive the connecting chains, not shown, of a plow unit. The other end of the shaft 53 is also provided with a disk 58 to which is connected another bracket 59 employed in the same capacity as the bracket 57. It will be evident that by rotating the hand wheel 60 of the shaft 56, that the gear 51 and the disk 58 will be rotated together and to a similar degree, so that when the plows are in the soil, their depth of operation may be controlled by the angularity of the brackets 57 and 59.

From the foregoing description taken in connection with the accompanying drawing it will be apparent that there is provided mechanism whereby the objects of the present invention and other desirable features have been achieved. It will be noted that the gearing between the drive shaft of the engine and the drum members is such that the latter will be capable of exerting the maximum degree of pulling strength or a powerful rotative force, so that the tractor may be readily employed to remove firmly embedded tree stumps from the soil. This feature is further desirable in effecting the elevation of coöperative plow units. If desired, the transmission housing 5 may be equipped with a controlling lever 61, by means of which the tractor may be actuated to advance forwardly or rearwardly at different rates of speeds, suitable for the purpose to which it is placed. By means of the link connection 45 between the clutch sleeve 43 and the member 21 it will be impossible to rotate the drums 39 during the normal advance of the tractor, and insures a full application of power to the shaft 37 or to the differential shafts 47. From the foregoing it is thought that the various features of the invention will be readily understood by those versed in the art and therefore a more extended explanation has been accordingly omitted.

I claim:

A tractor comprising a frame, a power unit carried thereby, a shaft driven by said unit, a worm loosely mounted upon said shaft, a gear meshing with said worm, a drum rotated by said gear, traction mechanism coöperatively driven by said shaft, and controlling means operable to impart motion from said shaft to said drum and traction mechanism in independent and alternate relation.

In testimony whereof I affix my signature.

LEVI KRING.